United States Patent Office 3,410,845
Patented Nov. 12, 1968

3,410,845
7-DIMETHYLAMINO-3,4,5,6,7,8-HEXAHYDRO-
2(1H)-AZOCINONES
Leo A. Paquette, Columbus, Ohio, assignor to The
Upjohn Company, Kalamazoo, Mich., a corporation of Delaware
No Drawing. Application July 16, 1964, Ser. No. 383,238, now Patent No. 3,320,238, dated Mar. 16, 1967, which is a continuation of application Ser. No. 307,370, Sept. 9, 1963. Divided and this application Jan. 20, 1967, Ser. No. 624,107
4 Claims. (Cl. 260—239.3)

ABSTRACT OF THE DISCLOSURE

This invention relates to certain 3,4,5,6,7,8-hexahydro-2(1H)-azocinones. These compounds have a number of utilities per se as well as being intermediates in the preparation of other useful compounds.

This application is a division of application Ser. No. 383,238, filed July 16, 1964, and now patent No. 3,320,238, which is a continuation of copending application Ser. No. 307,370, filed Sept. 9, 1963, and now abandoned.

This invention relates to novel compositions of matter and to methods for producing them. In particular, this invention relates to the free base form and acid addition salts of novel 3-dimethylaminooctahydroazocines of the formula.

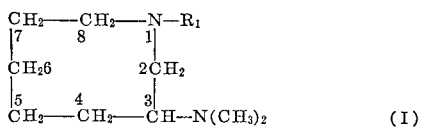

(I)

wherein $R_1$ is selected from the group consisting of hydrogen and lower alkyl. Examples of lower alkyl are methyl, ethyl, propyl, butyl, pentyl, hexyl, and isomeric forms thereof.

The novel 3-dimethylaminooctahydroazocines of Formula I are amines, and exist in the non-protonated or free base form, or in the protonated or acid addition salt form depending on the pH of the environment. They form stable protonates, i.e., mono- or di-acid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a Formula I compound, for example, the chloride ion of a hydrochloride, with the anionic form of a pencillin.

The novel free bases of Formula I, especially wherein $R_1$ is lower alkyl, are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The novel compounds of Formula I also form useful quaternary ammonium salts. For example, they form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. They also form aralkyl quaternary ammonium salts in a similar manner. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, and the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof. Examples of aralkyl are benzyl, phenethyl, 1-phenylethyl, 2-phenylpropyl, 3-phenylpropyl, 4-phenylbutyl, 1-naphthylmethyl, 2-(2-naphthyl)-ethyl, and the like.

The higher alkyl quaternary ammonium salts of the novel Formula I 3-dimethylaminooctahydroazocines, for example, wherein the alkyl group is of about 9 to about 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula I are useful as intermediates in the production of said alkyl and aralkyl quaternary ammonium salts.

The novel 3-dimethylaminooctahydroazocines of Formula I are produced by reacting a 7-dimethylamino-3,4,5,6,7,8-hexahydro-2(1H)-azocinone of the formula:

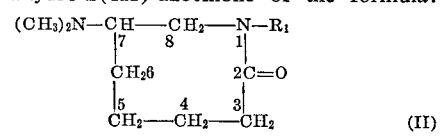

(II)

wherein $R_1$ is as given above, first with lithium aluminum hydride, and then with water and a base.

The particular compound, 1-methyl-3-dimethylamino-octahydroazocine (Formula I; $R_1$=methyl), can also be produced by reacting 3-dimethylaminooctahydroazocine (Formula I; $R_1$=hydrogen) with a mixture of formaldehyde and formic acid.

7-dimethylamino-3,4,5,6,7,8-hexahydro-2(1H)-azocinones of Formula II are novel in the art. Methods for producing them are outlined by the following equations:

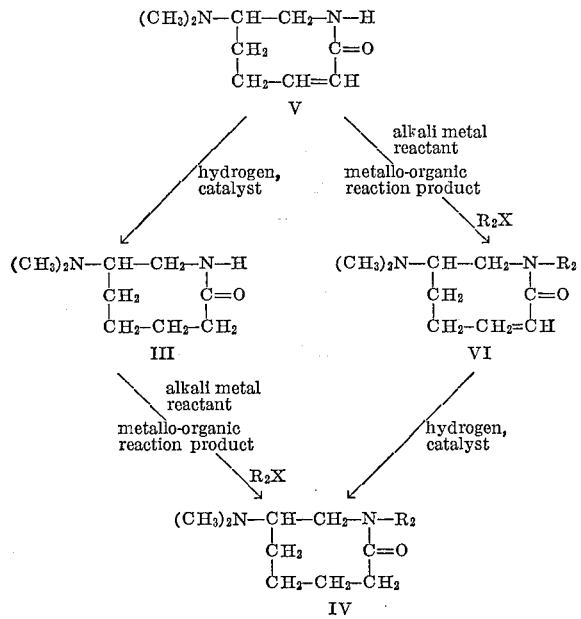

wherein $R_2$ is lower alkyl, wherein $R_2X$ is a lower alkyl halide selected from the group consisting of chlorides, bromides, and iodides, and wherein the alkali metal reactant is selected from the group consisting of alkali metals, alkali metal hydrides, and alkali metal amides. It will be noted that the compounds of Formula II include compounds of both Formula III and Formula IV.

7-dimethylamino-5,6,7,8-tetrahydro-2(1H)-azocinones of Formulas V and VI can be grouped conveniently into one formula:

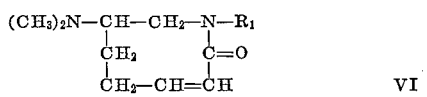

wherein $R_1$ is selected from the group consisting of hydrogen and lower alkyl. Compounds of Formula VII are novel in the art. Compounds of Formula VI (Formula VII; $R_1$=lower alkyl) are produced from 7-dimethylamino-5,6,7,8-tetrahydro-2(1H)-azocinone (Formula V or Formula VII wherein $R_1$=hydrogen) according to the previous equation.

7-dimethylamino-5,6,7,8-tetrahydro-2(1H)-azocinone is produced by heating 9,9-dimethyl-4-oxo-3-aza-9-azoniabicyclo[4.2.1]nonane hydroxide (Formula VIII) in the range about 125° to about 200° C., according to the equation:

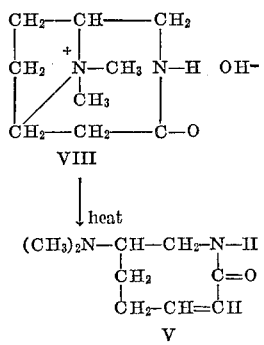

9,9-dimethyl-4-oxo-3-aza-9-azoniabicyclo[4.2.1]nonane hydroxide is novel in the art. It is produced by contacting a compound of the formula:

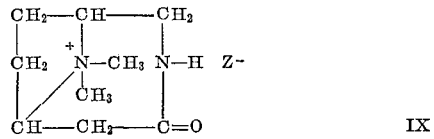

wherein $Z^-$ is an anion other than hydroxide, with an anion exchange resin in the basic form.

Quaternary ammonium salts of Formula IX are novel in the art. They are produced by reacting 9-methyl-3,9-diazabicyclo[4.2.1]nonan-4-one with a methyl quaternizing reactant, for example, methyl iodide. Other salts of Formula IX can be prepared by replacing the iodide ion with other anions, for example, chloride ion or perchlorate ion, or by a transannular reaction of 7-dimethylamino-5,6,7,8-tetrahydro-2(1H)-azocinone with a strong acid, for example, hydrochloric acid, perchloric acid, or trichloroacetic acid. Examples of anions which can be associated with the organic cation in Formula IX are fluoride, chloride, bromide, iodide, nitrate, sulfate, phosphate, fluosilicate, perchlorate, acetate, chloroacetate, trichloroacetate, benzoate, nicotinate, cyclohexanesulfamate, salicylate, and the like.

9-methyl-3,9-diazabicyclo[4.2.1]nonan-4-one is known in the art [Michaels et al., J. Org. Chem. 25, 637 (1960)].

7-dimethylamino-3,4,5,6,7,8-hexahydro-2(1H)-azocinones of Formula II are amines, and exist in the nonprotonated or free base form, or in the protonated or acid addition salt form, depending on the pH of the environment. They form stable protonates, i.e., acid addition salts, on neutralization with organic or inorganic acids such as those listed above.

Although 7-dimethylamino-5,6,7,8-tetrahydro-2(1H)-azocinones of Formula VII are also amines, attempts to form salts with acids, especially strong acids such as those with a dissociation constant about $10^{-2}$ at about 25° C., usually lead unexpectedly to the corresponding 9,9-dimethyl-4-oxo-3-aza-9-azoniabicyclo[4.2.1]nonane salt by a transannular ring closure. Examples of such strong acids are hydrochloric acid, perchloric acid, sulfuric acid, trichloroacetic acid, and the like. This transannular reaction usually proceeds satisfactorily in the range about 20° to about 60° C.

The novel Formula II and Formula VII compounds form alkyl and aralkyl quaternary ammonium salts in the manner discussed above with regard to the Formula I 3-dimethylaminooctahydroazocines. The anion of the Formula II or Formula VII quaternary ammonium salts can be any of those listed above. Examples of alkyl and aralkyl are also as listed above.

In addition to being useful as intermediates in the production of Formula I 3-dimethylaminooctahydroazocines, the novel 7-dimethylamino-3,4,5,6,7,8-hexahydro-2(1H)-azocinones of Formula II, the novel 7-dimethylamino-5,6,7,8-tetrahydro-2(1H)-azocinones of Formula VII, and the novel 9,9-dimethyl-4-oxo-3-aza-9-azoniabicyclo[4.2.1] nonane salts of Formula IX are useful for other purposes. For example, Formula II free bases are useful as acid acceptors, in forming mothproofing agents, in forming pickling inhibitors, and in forming penicillin salts, all as discussed above with regard to the utility of Formula I compounds. Formula II acid addition salts are useful for upgrading Formula II free bases. Formula II and Formula VII free bases are useful as catalysts in the production of polyurethanes as discussed above with regard to the utility of Formula I compounds, and are also useful as intermediates in the production of the corresponding alkyl and aralkyl quaternary ammonium salts.

The higher alkyl quaternary ammonium salts of the Formula II and Formula VII compounds are useful as detergent-sanitizers as discussed above for the related Formula I quaternary ammonium salts.

The lower alkyl quaternary ammonium salts of Formula II and Formula VII compounds are useful for the treatment of topical fungal infections in mammals, e.g., humans, cattle, horses, dogs, and cats, caused by such fungi as *Trichophyton rubrum*, or for eradicating such fungi from inanimate objects. They are also useful in the treatment of plant infections caused by such fungi as *Alternaria solani*.

The compounds of Formula II and Formula IX exhibit central nervous system stimulatory activity, and are therefore useful in animals, e.g., in mammals including humans, cattle, horses, dogs, and cats, and in birds including poultry, as antidepressants and to improve alertness.

The above-outlined transformations of 7-dimethylamino-3,4,5,6,7,8-hexahydro-2(1H)-azocinone (Formula III) to the corresponding 1-substituted 7-dimethylamino-3,4,5,6,7,8-hexahydro-2(1H)-azocinones (Formula IV), and 7-dimethylamino-5,6,7,8-tetrahydro-2(1H)-azocinone (Formula V) to the corresponding 1-substituted 7-dimethylamino-5,6,7,8-tetrahydro- 2(1H)-azocinones (Formula VI) are carried out under substantially the same reaction conditions. Examples of suitable alkali metal reactants for these reactions are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the N—H reactant, i.e., the 7-dimethylamino - 3,4,5,6,7,8-hexahydro-2(1H)-azocinone or 7-dimethylamino-5,6,7,8-tetrahydro-2(1H)-azocinone.

The alkali metal reactant and the N—H reactant are mixed, and the reaction between them is carried out at temperatures which can vary from about 0° to about 150° C., preferably from about 25° to about 100° C. The most suitable temperature will of course depend upon such factors as the reactivities of the alkali metal reactant and the N—H reactant, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the N—H reactant and the alkali metal reactant, although an excess of either reactant can be used. The time required for completing the reaction will depend on the reaction temperature, the reactivities of the two reactants, and the nature of the solvent. Illustratively, with sodium hydride, the reaction usually requires about 15 minutes to about 3 hours at temperatures ranging from about 50° to about 100° C.

After the reaction between the alkali metal reactant and the N—H reactant is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with the alkyl halide of the formula $R_2X$, as above defined.

Alkyl bromides and iodides are preferred for this next step because of their greater reactivity, although alkyl chlorides can be used and are advantageous in some instances because they are usually less expensive. Suitable organic bromides include methyl bromide, ethyl bromide, propyl bromide, isopropyl bromide, butyl bromide, sec-butyl bromide, isobutyl bromide, pentyl bromide, isopentyl bromide, 2-methylbutyl bromide, 1,2-dimethylpropyl bromide, 1-ethylpropyl bromide, 1-methylbutyl bromide, hexyl bromide, isohexyl bromide, 1-methylpentyl bromide, 1-ethylbutyl bromide, 2-methylpentyl bromide, 1,2-dimethylbutyl bromide, and the like. Suitable alkyl chlorides and iodides include those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

The alkylhalide is added to the metallo-organic reaction mixture either dropwise or in larger portions. Alternatively, the metallo-organic reaction mixture can be added in a similar manner to the alkyl halide. In either case, the alkyl halid can be dissolved in a suitable inert solvent, preferably in one or more of the solvents already present in the metallo-organic reaction mixture. Although only one molecular equivalent of the alkyl halide is required for reaction with one molecular equivalent of the metallo-organic reaction product, preferably calculated on the basis of the amount of the N—H reactant used to prepare the latter, it is preferred to use an excess of the halide, for example, about 1.01 to about 5 or even more molecular equivalents of halide per molecular equivalent of the metallo-organic reaction product. Particularly preferred is the use of about 1.05 to about 2 molecular equivalents of halide per molecular equivalent of metallo-organic reaction product. Suitable reaction times and reaction temperatures for the interaction of alkyl halid and metallo-organic reaction product depend upon the nature of the reactants and the solvent, and the usual inverse relationship between time and temperature is observed. The alkyl iodides are the most reactive and the alkyl chlorides the least reactive. Suitable reaction temperatures range from about 0° to about 200° C., preferably from about 10° to about 75° C. Usually, reaction temperatures ranging from about 25° to about 75° C. and reaction times ranging from about 1 to about 8 hours are satisfactory. The desired 1 - substituted 7 - dimethylamino - 3,4,5,6,7,-hexahydro-2(1H-azocinone or 1-substituted 7-dimethylamino-5,6,7,8-tetrahydro - 2(1H) - azocinone can be isolated from the reaction mixture by conventional methods, for example, by removal of reaction solvent by evaporation or distillation. If an alkali metal halide is present as a solid in the reaction mixture, it may with advantage be removed by filtration before the desired organic reaction product is isolated.

Suitable catalysts for the catalytic hydrogenation of 7-dimethylamino - 5,6,7,8 - tetrahydro - 2(1H) - azocinones (Formulas V or VI) to the corresponding 7-dimethylamino - 3,4,5,6,7,8 - hexahydro - 2(1H) - azocinones (Formula III or IV) are those effective to saturate a carbon-carbon double bond, e.g., noble metals such as platinum, palladium, rhodium, and the like, and base metals such as Raney nickel, Raney cobalt, and the like. A palladium catalyst on a carrier such as carbon is usually preferred.

The hydrogenation is preferably carried out in the presence of an inert solvent. Suitable solvents include methanol, ethanol, isopropyl alcohol, acetic acid, ethyl acetate, diethyl ether, dioxane, and the like. Hydrogenation pressures ranging from about atmospheric to about 50 p.s.i. and hydrogenation temperatures ranging from about 10° to about 100° C. are preferred.

The 7 - dimethylamino - 3,4,5,6,7,8 - hexahydro - 2 (1H)-azocinone product can be isolated from the hydrogenation reaction mixture by conventional techniques, for example, by filtration of the catalyst and removal of solvent by distillation. The product can be purified by conventional techniques, for example, by crystallization from a suitable solvent or mixture of solvents, by partition between two immiscible solvents, by chromatography, or by a combination of these techniques. For some applications, however, it is unnecessary to purify or even to isolate the hydrogenation product. Rather, it is often satisfactory to remove the hydrogenation catalyst by filtration or centrifugation, and then use the entire solution or the crude product after removal of solvent.

In the transformation of 7 - dimethylamino - 3, 4,5,6,7,8 - hexahydro - 2(1H) - azocinones (Formula II) to 3-dimethylaminooctahydroazocines (Formula I), the stoichiometric amounts of reactants correspond to 0.75 mole of lithium aluminum hydride and one mole of the Formula II compound when $R_1$ is hydrogen, and to 0.5 mole of lithium aluminum hydride and one mole of the Formula II compound when $R_1$ is alkyl. It is preferred, however, to use an excess of lithium aluminum hydride, advantageously 50 to 300 percent excess. A larger excess can be used but there is ordinarily no reason to do so. Diethyl ether is preferred as a reaction solvent. Tetrahydrofuran and dibutyl ether are examples of alternative solvents. It is preferred to add a diethyl ether solution of the organic reactant to a slurry of the lithium aluminum hydride in diethyl ether, and then to reflux the resulting reaction mixture for about one to about 10 hours, the optimum time being dependent on the nature of the organic reactant. It is important to exclude substantial amounts of moisture from the reaction mixture. The use of dry solvents, reactants, and reaction vessels is preferred.

The first step in the isolation of the desired reaction product from the lithium aluminum hydride reaction mixture involves addition of water and a base, preferably an alkali metal hydroxide such as sodium hydroxide. It is preferred generally to use the minimum amount of water for this step. It is usually satisfactory to cool the final reaction mixture externally with ice and then to add with stirring successively about 1 ml. of water, about 1 ml. of 25 percent aqueous sodium hydroxide solution, and about 3 ml. of water for each gram of lithium aluminum hydride originally used in the reaction mixture. When these amounts of water and sodium hydroxide solution are used, the aluminate salts usually precipitate in the form of a granular solid with no separate aqueous phase. This solid precipitate is readily separated from the organic solution by filtration or centrifugation. The free base form of the desired organic product can then be isolated by evaporation of the solvent, and can be purified by conventional techniques, for example, distillation, crystallization from a suitable solvent or mixture of solvents, or chromatography.

The free base form of Formula I 3-dimethylaminooctahydroazocine or of a Formula II 7-dimethylamino-3,4,5,6,7,8-hexahydro-2(1H)-azocinone is transformed to an acid addition salt by neutralization with the appropriate amount of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I or Formula II amine, the acid, and the acid addition salt. If the acid is soluble in water, the basic compound of Formula I or Formula II can be dissolved in water containing an equivalent amount of the acid, and thereafter, the water can be removed by evaporation. If the acid is soluble in a relatively non-polar solvent, for example, diethyl ether or diisopropyl ether, separate solutions of the acid and the amine in such a solvent can be mixed in equivalent amounts, whereupon the acid addition salt will usually precipitate because of its relatively low solubility in the non-polar solvent. Alternatively, the basic Formula I or Formula II compound can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. It is often advantageous when preparing an acid addition salt to omit isolation of the free base from its final reaction solvent, for example, the diethyl ether solution resulting from the lithium aluminum hydride reaction, or the solution remaining after catalytic hydrogenation as described above. Rather, one of these solutions can be treated directly with the appropriate acid. The acid can be added alone or as a solution in the same or a different solvent. The acid addition salt is usually a solid and can be purified by recrystallization from a suitable solvent or mixture of solvents. In the case of the Formula I compounds which are diamines, either monoacid or diacid addition salts can be formed by using one or two equivalents of the acid.

The quaternization of 9 - methyl - 3,9 - diazabicyclo[4.2.1]nonan - 4 - one, 7 - dimethylamino-5,6,7,8-tetrahydro - 2(1H) - azocinones (Formula VII), 7-dimethylamino-3,4,5,6,7,8-hexahydro-2(1H)-azocinones (Formula II), and 3-dimethylaminooctahydroazocines (Formula I) can be carried out by mixing the free base form of one of those compounds with the quaternization agent, for example, a methyl halide in the case of the 9-methyl-3,9-diazabicyclo[4.2.1]nonan-4-one or an alkyl or aralkyl halide in the case of the Formula VII, Formula II, or Formula I reactant. An inert reaction solvent, for example, ethanol, n-propanol, heptane, chloroform, benzene, toluene, or acetonitrile, can be used and is advantageous if the halide is gaseous or a solid at the desired reaction temperature. Although equimolecular amounts of the halide and the free base reactant can be used, it is often advantageous to use an excess of a halide which is normally a gas or a low-boiling liquid. For example, about 1.1 to about 10 moles or more or such an alkyl halide per mole of the free base reactant can be used. On the other hand, if the halide is of high molecular weight, an octadecyl or a napthylmethyl halide, for example, it is often advantageous to use an excess of the free base, for example, about 1.1 to about 5 moles per mole of the halide. The time and temperature of the reaction will depend largely on the reactivities of the reactants used, particularly on the nature of the halide. The reaction of the free base with an alkyl or aralkyl iodide usually proceeds more rapidly to completion than does the corresponding reaction with an alkyl or aralkyl chloride, the alkyl and aralkyl bromides being intermediate in this respect. At about 25° C. or below, the quaternization reaction usually requires about one or more days. At a higher temperature, for example, about 50° to about 120° C., the reaction is usually compete in about 1 to about 8 hours. Higher reaction temperatures than these are usually not necessary, although reaction temperatures up to about 225° C. are practical. As will be apparent to those skilled in the art, the completeness of the reaction may be determined at any time during the reaction by measuring the amount of halide ion present. Other quaternary salts, for example, the acetate, benzoate, nitrate, hydrocinnamate, salicylate, and sulfate can be prepared by treating the corresponding quaternary halide, for example, the bromide, in solution, in ethanol, with the appropriate silver salt, e.g., silver acetate or silver nitrate. Still other quaternary salts, for example, the fluosilicate and the phosphate, can be prepared by treating the corresponding quaternary halide, for example, the bromide, or the corresponding quaternary hydroxide, with the corresponding acid, i.e., fluosilicic acid or phosphoric acid. At the conclusion of any of the above reactions, the resulting quaternary salt can be isolated by conventional techniques, for example, by distillation of any reaction solvent used and any unreacted volatile reactants, preferably at reduced pressure. Any less volatile excess reactants can be removed by washing with a relatively non-polar solvent, for example, hexane, heptane, or the like. The desired product can then be purified, usually advantageously by recrystallization from a suitable solvent or solvent pair, for example, ethanol, ethyl acetate, ethanol plus diethyl ether, ethanol plus benzene, or the like.

The invention can be more fully understood by the following examples.

EXAMPLE 1

*9,9-dimethyl-4-oxo-3-aza-9-azoniabicyclo[4.2.1] nonane iodide*

A solution of 9-methyl-3,9-diazabicyclo[4.2.1]nonan-4-one (30.3 g.; 0.196 mole) and methyl iodide (85.4 g.; 0.60 mole) in 250 ml. of absolute ethanol was refluxed for 90 minutes. The tan solid which precipitated on cooling was filtered and dried to give 57.5 g. of 9,9-dimethyl-4-oxo-3-aza-9-azoniabicyclo[4.2.1]nonane iodide; M.P. 306° C. with decomposition. Recrystallization from a mixture of water, ethanol, and diethyl ether gave the same substance in the form of small white prisms; M.P. 306° C. with decomposition.

*Analysis.*—Calcd. for $C_9H_{17}IN_2O$: C, 36.50; H, 5.79; N, 9.46. Found: C, 36.94; H, 5.89; N, 9.10.

I.R. (principal bands; mineral oil mull) 3270 and 1650 cm.$^{-1}$.

EXAMPLE 2

*9,9-dimethyl-4-oxo-3-aza-9-azoniabicyclo[4.2.1] nonane chloride.*

A mixture of 9,9-dimethyl-4-oxo-3-aza-9-azoniabicyclo[4.2.1]nonane iodide (14.8 g.; 0.05 mole), silver oxide [prepared from 17.0 g. of silver nitrate according to "Organic Reactions," John Wiley & Sons, Inc., New York, vol. 11, p. 380 (1960)], 150 ml. of water, and 150 ml. of tetrahydrofuran was stirred for about 16 hours at about 25° C. The resulting mixture was filtered and evaporated. The residue was dissolved in a mixture of equal parts of ethanol and diethyl ether, and was then mixed with a diethyl ether solution of hydrogen chloride. The resulting white solid precipitate was filtered and recrystallized from ethanol to give 5.9 g. of 9,9-dimethyl-4-oxo-3-aza-9-azoniabicyclo[4.2.1]nonane chloride; M.P. 287° C. with decomposition. Further recrystallization from ethanol gave the same substance in the form of white prisms; M.P. 287° C. with decomposition.

*Analysis.*—Calcd. for $C_9H_{17}ClN_2O$: C, 52.80; H, 8.37; Cl, 17.32; N, 13.69. Found: C, 53.02; H, 8.34; Cl, 17.32; N, 13.06.

Following the procedure of Example 2 but substituting for the diethyl ether solution of hydrogen chloride, diethyl ether solutions of hydrogen bromide; sulfuric acid; nitric acid; phosphoric acid; benzoic acid; acetic acid; and salicyclic acid, there are obtained the corresponding bromide; sulfate; nitrate; phosphate; benzoate; acetate; and salicylate salts.

EXAMPLE 3

*7-dimethylamino-5,6,7,8-tetrahydro-2(1H)-azocinone*

A solution of 9,9-dimethyl-4-oxo-3-aza-9-azoniabicyclo [4.2.1]nonane iodide (29.6 g.; 0.10 mole) in 75 ml. of water was passed through a column of the basic form of Amberlite IRA–400 (a granular form of a styrene-divinyl benzene copolymer which has been successively chloromethylated and quaternized with trimethylamine; obtained from the Rohm & Haas Company, Philadelphia Pa.). The column was eluted with water until 2 liters of eluate had been collected. The eluate was concentrated to a syrup which was then heated in the range 150° to 170° C. The water which was formed was removed by distillation. The residue was distilled to give 14.35 g. of 7-dimethylamino-5,6,7,8-tetrahydro-2(1H)-azocinone in the form of a colorless viscous oil; B.P. 143–144° C. at 0.1 mm.

*Analysis.*—Calcd. for $C_9H_{10}N_2O$: C, 64.25; H, 9.59; N, 16.65. Found: C, 64.56; H, 9.98; N, 15.95.

I.R. (principal bands; without dilution) 3220, 1665, and 1625 cm.$^{-1}$.

EXAMPLE 4

*Trimethyl(1,2,5,6,7,8-hexahydro-2-oxo-7-azocinyl) ammonium iodide.*

A mixture of 7 - dimethylamino - 5,6,7,8 - tetrahydro - 2(1H)-azocinone (6.7 g.; 0.039 mole), methyl iodide (14.2 g.; 0.10 mole), and 50 ml. of absolute ethanol was refluxed 2 hours. Cooling and addition of about 100 ml. of diethyl ether gave 12.1 g. of a pale yellow powder; M.P. 187–189° C. Recrystallization of this powder from ethanol gave trimethyl(1,2,5,6,7,8 - hexahydro - 2 - oxo - 7-azocinyl)ammonium iodide in the form of a white solid; M.P. 192–194° C.

*Analysis.*—Calcd. for $C_{10}H_{19}IN_2O$: C, 38.72; H, 6.17; N, 9.03. Found: C, 38.53; H, 6.39; N, 8.77.

Following the procedure Example 4 but substituting for methyl iodide, butyl bromide; lauryl bromide; benzyl bromide; and 1-naphthylmethyl bromide, there are obtained butyldimethyl(1,2,5,6,7,8 - hexahydro - 2 - oxo - 7 - azocinyl)ammonium bromide; lauryldimethyl(1,2,5,6,7,8 - hexahydro-2-oxo-7-azocinyl)ammonium bromide; benzyldimethyl(1,2,5,6,7,8 - hexahydro - 2 - oxo - 7 - azocinyl) ammonium bromide; and dimethyl(1-naphthylmethyl) (1,2,5,6,7,8 - hexahydro - 2 - oxo - 7 - azocinyl)ammonium bromide, respectively.

EXAMPLE 5

*9,9-dimethyl-4-oxo-3-aza-9-azoniabicyclo[4.2.1] nonane perchlorate.*

A solution of perchloric acid (1 ml. of 70% aqueous) in 1 ml. of absolute ethanol was added dropwise to a solution of 7 - dimethylamino - 5,6,7,8 - tetrahydro - 2(1H) - azocinone (1.7 g.) in 20 ml. of dried diethyl ether. Cooling caused precipitation of a gummy white solid. The liquid was decanted and 10 ml. of ethanol was added to the solid. Warming for 30 seconds on a steam bath and scratching with a glass rod caused crystallization. The solid was filtered, washed with diethyl ether, and dried to give 2.6 g. of a white solid; M.P. near 140° C. with rapid heating. With slow heating, the solid softened at 140–150° C. and melted with decomposition at 327° C. Two recrystallizations from ethanol gave 2.5 g. of 9,9-dimethyl-4-oxo-3-aza-9-azoniabicyclo[4.2.1]nonane perchlorate; M.P. 334° C. with decomposition.

*Analysis.*—Calcd. for $C_9H_{17}ClN_2O_5$: C, 40.22; H, 6.38; N, 10.43. Found: C, 40.47; H, 6.36; N, 10.32.

I.R. (principal bands; mineral oil mull) 3360 and 1655 cm.$^{-1}$.

The above quaternary perchlorate was also prepared by successive additions of 70% aqueous perchloric acid and diethyl ether to an ethanol solution of 9,9-dimethyl-4-oxo-3-aza-9-azoniabicyclo[4.2.1]nonane iodide, followed by recrystallization from ethanol; M.P. 335° C. with decomposition. The infrared spectra of the two perchlorates were substantially identical.

Following the procedure of Example 5 but substituting for perchloric acid in the reaction with 7-dimethylamino- 5,6,7,8-tetrahydro-2(1H)-azocinone, hydrogen chloride; sulfuric acid; and trichloroacetic acid, there are obtained 9,9 - dimethyl - 4 - oxo - 3 - aza - 9 - azoniabicyclo[4.2.1] nonane chloride, acid sulfate, and trichloroacetate, respectively.

EXAMPLE 6

*7-dimethylamino-3,4,5,6,7,8-hexahydro-2(1H)-azocinone*

A mixture of 7 - dimethylamino - 5,6,7,8 - tetrahydro - 2(1H)-azocinone (16.8 g.; 0.10 mole), 150 ml. of ethyl acetate, and 500 mg. of palladium catalyst (10% palladium on charcoal) was shaken with hydrogen at an initial pressure of 50 p.s.i.g. with gradual heating to 60° C. during one hour. Absorption of hydrogen ceased after 0.1 mole had been consumed. After cooling, the catalyst was removed by filtration, and solvent was evaporated to give 16.8 g. of 7-dimethylamino-3,4,5,6,7,8-hexahydro-2(1H)-azocinone in the form of a colorless viscous oil.

A portion of the above free base was dissolved in diethyl ether. Addition of ethereal hydrogen chloride gave a solid which was recrystallized from a mixture of ethanol and diethyl ether to give 7 - dimethylamino - 3,4,5,6,7,8 - hexahydro-2(1H)-azocinone hydrochloride in the form of a fine white powder; M.P. 190.5° C.

Analysis.—Calcd. for $C_9H_{19}ClN_2O$: C, 52.29; H, 9.26; N, 13.55. Found: C, 52.03; H, 9.32; N, 13.43.

I.R. (principal bands; mineral oil mull) 3260 and 1650 cm.$^{-1}$.

Following the procedure of Example 6 but using in place of ethereal hydrogen chloride, ethereal solutions of perchloric acid; sulfuric acid; phosphoric acid; cyclohexanesulfamic acid; and benzoic acid, there are obtained the corresponding acid addition salts of 7-dimethylamino-3,4,5,6,7,8-hexahydro-1(2H)-azocinone.

EXAMPLE 7

*Trimethyl(octahydro-2-oxo-7-azocinyl)ammonium iodide*

A mixture of 7-dimethylamino-3,4,5,6,7,8-hexahydro-1 (2H)-azocinone (3.4 g.; 0.02 mole), methyl iodide (14.2 g.; 0.10 mole), and 35 ml. of absolute ethanol was refluxed 2 hours. Diethyl ether was then added to the resulting warm solution until the mixture just became cloudy. Cooling resulted in precipitation of 6.1 g. of a white solid; M.P. 206–208° C. Recrystallization from a mixture of ethanol, diethyl ether, and water gave trimethyl(octahydro-2-oxo-7-azocinyl)ammonium iodide in the form of white prisms; M.P. 221–222° C.

Analysis.—Calcd. for $C_{10}H_{21}IN_2O$: C, 38.47; H. 6.78; N, 8.97. Found: C, 38.79; H, 6.77; N, 9.22.

Following the procedure of Example 7 but substituting for the methyl iodide, butyl bromide; lauryl bromide; benzyl bromide; and 1-naphthylmethyl bromide, there are obtained butyldimethyl - (octahydro - 2-oxo-7-azocinyl)ammonium bromide; lauryldimethyl) - (octahydro-2-oxo - 7-azocinyl)ammonium bromide; benzyldimethyl-(octahydro-2-oxo - 7-azocinyl)ammonium bromide; and dimethyl(1-naphthylmethyl)-(octahydro - 2-oxo - 7-azocinyl)ammonium bromide, respectively.

EXAMPLE 8

*3-dimethylaminooctahydroazocine*

A solution of 7-dimethylamino-3,4,5,6,7,8-hexahydro-1-(2H)-azocinone (9.3 g.; 0.054 mole) in 75 ml. of diethyl ether was added dropwise to a stirred slurry of lithium aluminum hydride (3.8 g.; 0.10 mole) in 75 ml. of diethyl ether at such a rate that a gentle reflux was maintained. The resulting mixture was then stirred and refluxed for an additional hour. After cooling, the mixture was treated consecutively with 3.8 ml. of water, 3.8 ml. of 25% aqueous sodium hydroxide solution, and 11.5 ml. of water. The solid which precipitated was filtered and washed with diethyl ether. The combined filtrate and washings were evaporated under reduced pressure, and the residue was distilled to give 7.2 g. of 3-dimethylaminooctahydro- azocine in the form of a colorless liquid; B.P. 98–100° C. at 11 mm.; $n_D^{25}$ 1.4838.

A portion of the above free base was dissolved in diethyl ether. Addition of excess ethereal hydrogen chloride gave a solid which was recrystallized from a mixture of ethanol and diethyl ether to give 3-dimethylaminooctahydroazocine dihydrochloride in the form of white platelets; M.P. 212–213° C.

Analysis.—Calcd. for $C_9H_{22}Cl_2N_2$: C, 47.16; H, 9.68; N. 12.22. Found: C, 47.42; H, 9.71; N, 12.24.

Following the procedure of Example 8 but using in place of ethereal hydrogen chloride, ethereal solutions of perchloric acid; sulfuric acid; phosphoric acid; cyclohexanesulfamic acid; and benzoic acid, there are obtained the corresponding diacid addition salts of 3-dimethyl-aminooctahydroazocine.

Following the procedure of Example 8 but using one equivalent of hydrogen chloride, there is obtained the monohydrochloride of 3-dimethylaminooctahydroazocine.

EXAMPLE 9

*1-methyl-3-dimethylaminooctahydroazocine*

3-dimethylaminooctahydroazocine (4.7 g.; 0.03 mole) was added slowly to an 88% aqueous formic acid solution (5.1 g.; equivalent to 0.10 mole of formic acid) with external ice cooling. To the resulting clear solution, 37% aqueous formaldehyde solution (3.4 ml.; equivalent to 0.03 mole of formaldehyde) was added. When the immediate initial evolution of carbon dioxide had subsided, the reaction mixture was heated at about 100° C. for 3 hours. After cooling, 30 ml. of 4 normal hydrochloric acid was added and the solution was evaporated to dryness. The residue was dissolved in about 25 ml. of water and made basic by addition of 50% aqueous sodium hydroxide solution. Extraction with three 50-ml. portions of methylene chloride, followed by drying and evaporation of the combined methylene chloride extracts, gave an oil which was distilled to give 4.0 g. of 1-methyl-3-dimethylaminooctahydroazocine in the form of a colorless liquid; B.P. 94–95° C. at 12 mm.

The above free base was dissolved in diethyl ether. Addition of excess ethereal hydrogen chloride gave a solid which was recrystallized from a mixture of ethanol and diethyl ether to give 1-methyl-3-dimethylaminooctahydroazocine dihydrochloride in the form of a white solid; M.P. 198–201° C.

Analysis.—Calcd. for $C_{10}H_{24}Cl_2N_2$: C, 49.38; H, 9.94; N, 11.52. Found: C, 48.98; H, 1006; N, 1129.

EXAMPLE 10

*1-methyl-7-dimethylamino-5,6,7,8-tetrahydro-2(1H)azocinone*

A 51.5% sodium hydride suspension in mineral oil (1.55 g.; equivalent to 0.033 mole of sodium hydride) was added to a solution of 7-dimethylamino-5,6,7,8-tetrahydro-2(1H)-azocinone (5.5 g.; 0.033 mole) in 40 ml. of dimethylformamide. The resulting mixture was stirred and warmed to 50° C. during 30 minutes. After cooling to about 10° C., methyl iodide (4.9 g.; 0.0345 mole) was added. A precipitate formed. The mixture was then heated with stirring at 50° C. for 30 minutes. After again cooling to about 20° C., 50 ml. of diethyl ether was added and the precipitate was filtered. The filtrate was evaporated, and the residual oil was distilled to give a colorless liquid which was redistilled to give 1-methyl-7-dimethylamino-5,6,7,8-tetrahydro-2(1H)-azocinone.

Following the procedure of Example 10, but substituting for the methyl iodide, isopropyl chloride; propyl iodide; isobutyl bromide; pentyl bromide; and hexyl chloride, there are obtained 1-isopropyl - 7 - dimethylamino-5,6,7,8-tetrahydro - 2(1H) - azocinone; 1-propyl - 7 - di methylamino-5,6,7,8-tetrahydro - 2(1H) - azocinone; 1-isobutyl - 7-dimethylamino - 5,6,7,8-tetrahydro - 2(1H)-azocinone; 1-pentyl-7 - dimethylamino-5,6,7,8-tetrahydro- 2(1H) - azocinone; and 1-hexyl - 7 - dimethylamino-5,6,7,8-tetrahydro-2(1H)-azocinone, respectively.

EXAMPLE 11

*Trimethyl(1,2,5,6,7,8-hexahydro-1-methyl-2-oxo-7-azocinyl)ammonium iodide*

Following the procedure of Example 4, 1-methyl-7-dimethylamino - 5,6,7,8-tetrahydro - 2(1H) - azocinone. (7.1 g.; 0.039 mole) was reacted with methyl iodide (14.2 g.; 0.10 mole) in 50 ml. of absolute ethanol to give trimethyl(1,2,5,6,7,8 - hexahydro-1-methyl - 2-oxo - 7-azocinyl)ammonium iodide.

Following the procedure of Example 11, but using in place of the combination of 1-methyl-7-dimethylamino-5,6,7,8-tetrahydro-2(1H)-azocinone and methyl iodide as reactants, 1-isopropyl-7-dimethylamino-5,6,7,8-tetrahydro-2(1H)-azocinone plus butyl bromide; 1-isobutyl-7 - dimethylamino - 5,6,7,8 - tetrahydro - 2(1H) - azocinone plus lauryl bromide; and 1-hexyl-7-dimethylamino-5,6,7,8-tetrahydro-2(1H)-azocinone plus benzyl bromide, there are obtained butyldimethyl(1,2,5,6,7,8-hexahydro - 1 - isopropyl - 2 - oxo - 7 - azocinyl)ammonium bromide; lauryldimethyl(1,2,5,6,7,8-hexahydro-1-isobutyl-2-oxo-7-azocinyl)ammonium bromide; and benzyldimethyl(1,2,5,6,7,8 - hexahydro - 1 - hexyl - 2 - oxo-7-azocinyl)ammonium bromide, respectively.

EXAMPLE 12

*1-methyl-7-dimethylamino-3,4,5,6,7,8-hexahydro-2(1H)-azocinone*

Following the procedure of Example 6, 1-methyl-7-dimethylamino - 5,6,7,8 - tetrahydro - 2(1H) - azocinone (18.2 g.; 0.10 mole) was reacted with hydrogen in the presence of 150 ml. of ethyl acetate and 500 mg. of palladium catalyst. There was obtained 1-methyl-7-dimethylamino-3,4,5,6,7,8-hexahydro-2(1H)-azocinone.

Following the procedure of Example 6, a diethyl ether solution of 1-methyl-7-dimethylamino-3,4,5,6,7,8-hexahydro-2(1H)-azocinone was mixed with ethereal hydrogen chloride to give the corresponding hydrochloride. Using in place of ethereal hydrogen chloride, ethereal solutions of perchloric acid, sulfuric acid, phosphoric acid cyclohexanesulfamic acid, and benzoic acid, there are obtained the corresponding acid addition salts of 1 - methyl - 7 - dimethylamino - 3,4,5,6,7,8 - hexahydro-2(1H)-azocinone.

Following the procedure of Example 12, 1-isopropyl-7 - dimethylamino - 3,4,5,6,7,8 - hexahydro - 2(1H)-azocinone; 1 - isobutyl - 7 - dimethylamino - 3,4,5,6,7,8-hexahydro - 2(1H) - azocinone; 1 - pentyl - 7 - dimethylamino - 3,4,5,6,7,8 - hexahydro - 2(1H) - azocinone; and 1 - hexyl - 7 - dimethylamino - 3,4,5,6,7,8 - hexahydro-2(1H)-azocinone are prepared by catalytic hydrogenation of 1-isopropyl-7-dimethylamino-5,6,7,8-tetrahydro - 2(1H) - azocinone; 1 - isobutyl - 7 - dimethylamino - 5,6,7,8 - tetrahydro - 2(1H) - azocinone; 1 - pentyl - 7 - dimethylamino - 5,6,7,8 - tetrahydro - 2(1H)-azocinone; and 1-hexyl-7-dimethylamino-5,6,7,8-tetrahydro-2(1H)-azocinone, respectively, and then transformed to the corresponding hydrochloric acid addition salts.

EXAMPLE 13

*Trimethyl(octahydro-1-methyl-2-oxo-7-azocinyl) ammonium iodide*

Following the procedure of Example 7, 1-methyl-7-dimethylamino - 3,4,5,6,7,8 - hexahydro - 2(1H) - azocinone (3.7 g.; 0.02 mole) was reacted with methyl iodide (14.2 g.; 0.10 mole) in 35 ml. of absolute ethanol to give trimethyl(octahydro - 1 - methyl - 2 - oxo - 7 - azocinyl) ammonium iodide.

Following the procedure of Example 13, but using in place of the combination of 1-methyl-7-dimethylamino-3,4,5,6,7,8-hexahydro-2(1H)-azocinone and methyl iodide as reactants, 1-isopropyl-7-dimethylamino-3,4,5,6,7, 8-hexahydro-2(1H)-azocinone plus butyl bromide; 1-isobutyl - 7 - dimethylamino - 3,4,5,6,7,8 - hexahydro-2(1H)-azocinone plus lauryl bromide; and 1-hexyl-7-dimethylamino - 3,4,5,6,7,8 - hexahydro - 2(1H) - azocinone plus benzyl bromide, there are obtained butyldimethyl(octahydro - 1 - isopropyl - 2 - oxo - 7 - azocinyl) ammonium bromide; lauryldimethyl(octahydro-1-isobutyl-2-oxo-7-azocinyl)ammonium bromide; and benzyldimethyl(octahydro - 1 - hexyl - 2 - oxo - 7 - azocinyl)ammonium bromide, respectively.

I claim:
1. A compound selected from the group consisting of the free base form, pharmaceutically acceptable acid addition salts, alkyl quaternary ammonium salts wherein said alkyl contains from one to 20 carbon atoms, inclusive, phenyl-lower-alkyl quaternary ammonium salts, and naphthyl-lower-alkyl quaternary ammonium salts of a compound of the formula:

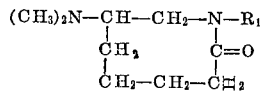

wherein $R_1$ is selected from the group consisting of hydrogen and lower alkyl.

2. 7 - dimethylamino - 3,4,5,6,7,8 - hexahydro - 2(1H)-azocinone.

3. 7 - dimethylamino - 3,4,5,6,7,8 - hexahydro - 2(1H)-azocinone hydrochloride.

4. Trimethyl(octahydro - 2 - oxo - 7 - azocinyl) ammonium iodide.

References Cited

UNITED STATES PATENTS 3,089,872 5/1963 Krapcho _____ 260—239.3

JOHN D. RANDOLPH, *Primary Examiner.*

ROBERT T. BOND, *Assistant Examiner.*